Figure 1:
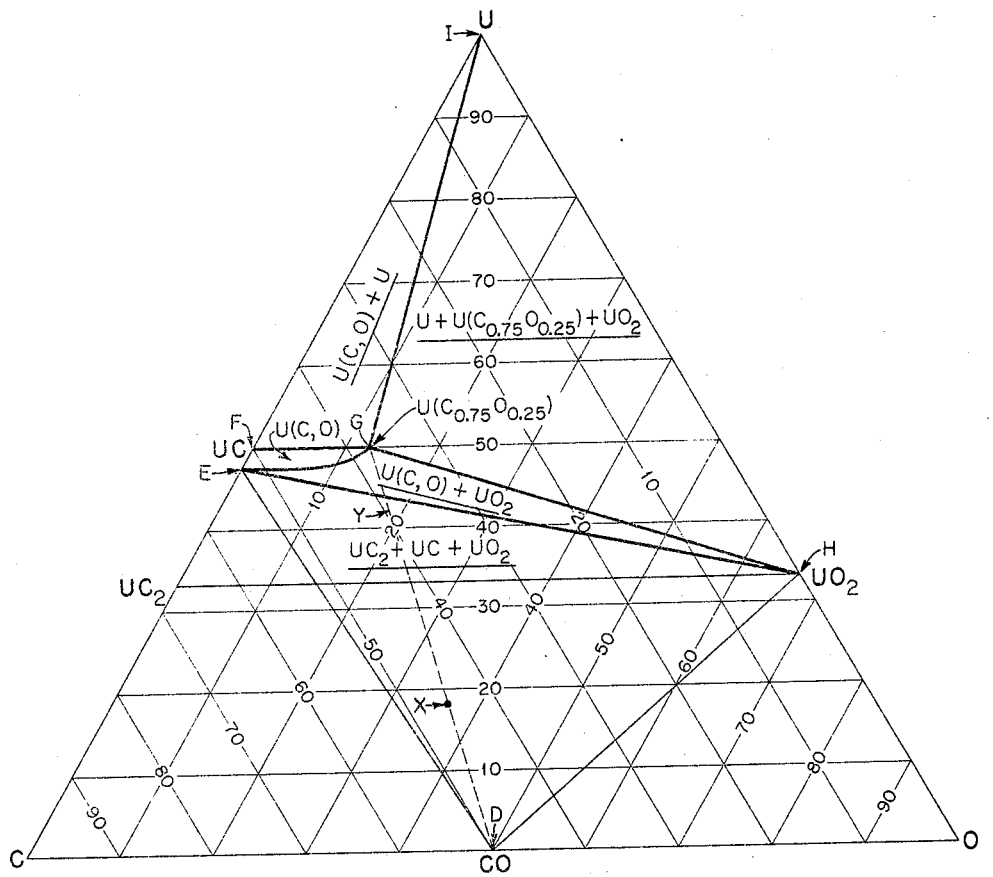

Sept. 28, 1965 R. F. STOOPS ETAL 3,208,818
METHOD FOR STABILIZING URANIUM MONOCARBIDE
Filed April 29, 1963 2 Sheets-Sheet 1

INVENTORS.
Robert F. Stoops
BY John V. Hamme

ATTORNEY.

Sept. 28, 1965   R. F. STOOPS ETAL   3,208,818
METHOD FOR STABILIZING URANIUM MONOCARBIDE
Filed April 29, 1963                       2 Sheets-Sheet 2

INVENTORS.
Robert F. Stoops
BY   John V. Hamme

ATTORNEY.

United States Patent Office

3,208,818
Patented Sept. 28, 1965

3,208,818
METHOD FOR STABILIZING URANIUM MONOCARBIDE
Robert F. Stoops and John V. Hamme, Raleigh, N.C., assignors to the United States of America as represented by the United States Atomic Energy Commission
Filed Apr. 29, 1963, Ser. No. 276,678
4 Claims. (Cl. 23—14.5)

The present invention relates to a method of stabilizing uranium monocarbide. More particularly, it relates to an oxygen-containing uranium carbide compound and to a method for its synthesis.

Uranium monocarbide is characterized by a favorable combination of nuclear and physical characteristics which make it useful as a nuclear fuel in power-producing nuclear reactors operating at high power levels to high fuel burnups. Among the desirable physical and nuclear properties of this compound are its high melting point, its isotropic crystal structure even at high temperatures, high thermal conductivity, high uranium density, low parasitic neutron cross section, and good thermal and radiation stability. A review of current knowledge concerning the various ways in which uranium monocarbide may be prepared and used as a nuclear fuel is given in the journal, "Nuclear Engineering," vol. 5, No. 51, August 1960, pages 353–357, and the book, Uranium Metallurgy, vol. II, John Wiley and Sons, 1962, pages 947–980.

The favorable characteristics of uranium monocarbide for use as a nuclear fuel are at least partially offset by its chemical reactivity and the difficulty in preparing it as a stoichiometric uranium carbide product (i.e., containing 4.8 weight percent carbon). Uranium monocarbide powder is pyrophoric and, in any form, reacts with atmospheric air or water vapor either by a hydrolysis reaction or by an oxidative mechanism. The carbide can be formed by several synthetic routes utilizing powder metallurgical techniques. During its synthesis, extreme care must be taken to minimize oxidative or hydrolyzing atmospheres and to prevent excessive amounts of uranium dicarbide ($UC_2$) as a by-product. $UC_2$ has deleterious effects on the properties of the finally formed body because it is considerably more reactive than uranium monocarbide and prevents attainment of maximum compact density.

It is, therefore, an object of the present invention to provide a uranium carbide product with substantially the same favorable characteristics as uranium monocarbide, but which is further characterized in that its chemical reactivity is at least partially reduced.

Another object of this invention is to provide a uranium carbide product with the same favorable characteristics as uranium monocarbide, but which is not contaminated with deleterious amounts of other uranium carbides such as uranium dicarbide ($UC_2$) or uranium sesquicarbide ($U_2C_3$).

Another object of this invention is to provide a uranium carbide product having the same crystal structure as uranium monocarbide, but which is further characterized in that it is more chemically stable than uranium monocarbide.

Still another object of this invention is to provide an oxygen-saturated uranium carbide composition.

A further object of this invention is to provide a process for effecting the foregoing objects.

These and other objects and resultant advantages are realized by a process characterized by the steps of forming a reaction mixture selected from (1) $C+UO_2$; (2) $UC+UO_2$; (3) $UC_2+UO_2$; (4) $UH_3+C+UO_2$; (5) $U+C+UO_2$; (6) $U+UC+UO_2$; (7) $U+UC_2+UO_2$; (8) $UC+U_3O_8$; (9) $UC_2+U_3O_8$; (10) $U+CO$ (gas); (11) $UC+CO$ (gas); (12) $C+U_3O_8$ and (13) $U+C+U_3O_8$ by selecting the components of said reaction mixture, by reference to the accompanying phase diagram, from a point along a line connecting point D to a point on the line E–H, heating said reaction mixture to a temperature in the range 1525° C. to 2000° C. while maintaining a pressure no greater than the partial pressure of carbon monoxide, which would be in equilibrium with the desired composition of the reaction products at said temperature, over said reaction mixture, for a period of time sufficient to form a compound of the formula $U(C_xO_{1-x})$ where X is a number which represents the number of carbon atoms per uranium atom, ranging from a minimum value of 0.75 to a maximum value of slightly less than 1.

In the drawings, FIG. 1 is a phase diagram plotted on triangular coordinates where the coordinates refer to the uranium, carbon and oxygen content of a given composition, in atomic percent, with the diagram expressing the phase relationships existing in furnace cooled or quenched mixtures which have been reacted at 1800° C.

Figure 2:
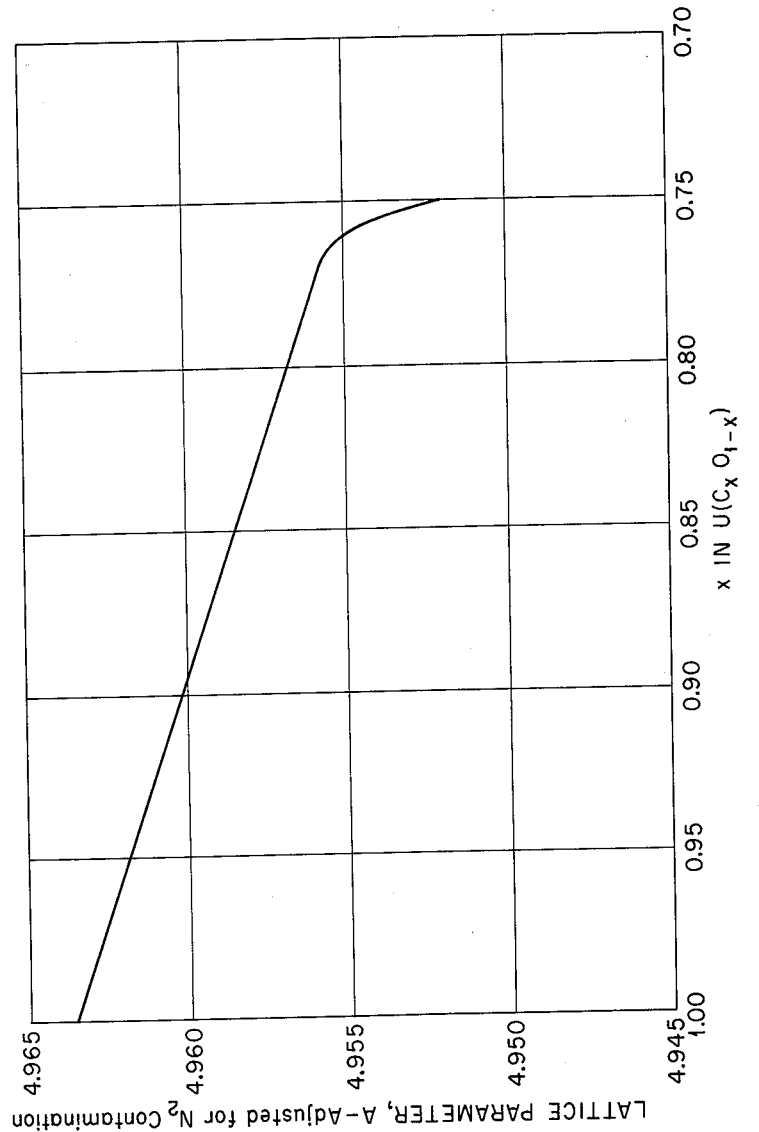

FIG. 2 is a graph showing the variation in lattice parameter as a function of X which represents the fraction of carbon atoms per uranium atom in the formula $U(C_xO_{1-x})$. The curve of FIG. 2 gives the lattice parameters of compositions represented by points on the line E–G in FIG. 1. The lattice parameter varies linearly from 4.961 A. for UC to 4.952 A. for $U(C_{.75}O_{.25})$.

With the aid of the phase diagram of FIG. 1 taken in combination with the accompanying disclosure, it is now possible for the first time to establish the phase relationships and the conditions required for the synthesis of oxygen-containing uranium monocarbide of predictable composition and to reproduce accurately said composition as desired. A still further advantage of this invention, as the phase diagram and the accompanying disclosure show, is that it is now possible to synthesize reproducibly a uranium monocarbide-like structure which is uncontaminated or essentially uncontaminated with deleterious amounts of other uranium carbides such as uranium dicarbide $UC_2$ or uranium sesquicarbide $U_2C_3$. For example, consider the synthesis of a compound having a composition $U(C_xO_{1-x})$ as shown in the phase diagram. This compound, as will be demonstrated later, is, in effect, uranium monocarbide in which a maximum of 25% of the carbon atoms in the uranium monocarbide crystal lattice have been replaced by oxygen atoms. This oxygen-containing uranium carbide product retains the favorable characteristic sodium chloride crystal structure of uranium monocarbide, but differs from uranium monocarbide in that it is considerably less reactive than uranium monocarbide as evidenced by a decreased lattice parameter, i.e., a decreased U–C spacing and an enhanced resistance to hydrolysis and/or oxidation, relative to uranium monocarbide. The synthesis of this "uranium monocarbide-like" compound, $U(C_xO_{1-x})$, is exceedingly simple, and may be illustrated in connection with the compound $U(C_{0.75}O_{0.25})$ where the total number of carbon and oxygen atoms is equal to the number of uranium atoms and where this compound may be considered, as will be shown, to be fully saturated in its oxygen content. To make this oxygen-saturated phase where $X=0.75$, a starting composition represented by any point upon dotted line D–G may be used. Thus, consider now an initial reaction mixture of carbon and uranium dioxide in the proportions indicated at point X along the dotted line D–G in the phase diagram. The carbon and uranium dioxide should preferably be in powder form and have a particle size 10 microns or below although larger size particles, pellets or chips will also yield the same product. The initial reactants are intimately mixed, such as by ball milling, then cold pressed to form a compact and the compact placed in a beryllia crucible or container within a gas-tight furnace heated by radio frequency induction means. The furnace is connected to a vacuum system and ancillary gas pressure gauge and metering means. Prior to firing, the furnace is evacuated to about 5 microns of mercury pressure or less. The radio frequency power source is then energized. As the temperature is increased, the composition of the reaction mixture will vary along the line D–G, depending upon the partial pressure of carbon monoxide maintained in the furnace above said mixture. At a temperature in the range 1525° C.–2000° C., the composition of the products of reaction will change to that indicated, for example, by point Y if the carbon monoxide pressure is lower than the pressure at which $UO_2$, uranium dicarbide and carbon are in equilibrium. As the carbon monoxide partial pressure is adjusted to or, preferably, below the equilibrium pressure for compositions on line E–H, the composition of the reaction products will move along the dotted line and will reach a composition in the two-phase area $U(C, O) + UO_2$ (area E, G, H) where the amount of carbon and oxygen in the $U(C, O)$ compound will vary between UC and $U(C_{.75}O_{.25})$. Carbon monoxide equilibrium pressures for compositions along line E–H are approximately 8 mm. at 1525° C. and 693 mm. at 2000° C. The single oxygen-saturated phase, as shown at point G, will be formed if the carbon monoxide pressure is adjusted to or, preferably, below the equilibrium pressure for $U(C_{.75}O_{.25})$. This equilibrium pressure is approximately 0.1 micron at 1525° C. and 2340 microns at 2000° C. The rate at which the oxygen saturated single phase is formed will be dependent on the rate at which carbon monoxide is removed which is dependent on the speed of the vacuum pumping system. If heating at temperature is continued with further carbon monoxide removal after $U(C_{.75}O_{.25})$ has been formed, the composition of the products of the reaction will now extend into the two-phase region $U(C, O) + U$ (area I, G, F) consisting of, as indicated in the phase diagram, carbon-saturated uranium metal and a $U(C, O)$ compound with less than the maximum oxygen content. And, finally, if the carbon monoxide pressure is reduced to zero, the final composition of the reaction products will consist of uranium monocarbide and carbon-saturated uranium metal.

A composition within the three-phase region $$U + UO_2 + U(C_{.75}O_{.25})$$

can also be reached. This may be done by choosing an initial reaction mixture which falls along a line running from point D to any point on the line between G and H and heating said reaction mixture to a temperature in the range of 1525° C.–2000° C. while maintaining a pressure equal to or, preferably, below the partial pressure of carbon monoxide in equilibrium with $U + UO_2 + U(C_{.75}O_{.25})$. This equilibrium pressure is approximately 0.1 micron at 1525° C. and 2340 microns at 2000° C.

Further, in a similar manner, reaction products consisting of the two phases $UO_2$ and $U(C_xO_{1-x})$ as shown in the area E, G, H may be obtained. This is accomplished by choosing an initial reaction mixture which falls along a line running from point D to any point on the line between E and H or which falls within the area E, G, H and heating said reaction mixture to a temperature in the range 1525° C.–2000° C. while maintaining a pressure which does not exceed the equilibrium partial pressure of carbon monoxide over said mixture. At 1525° C. the equilibrium carbon monoxide partial pressures for compositions in area E, G, H vary continuously from approximately 8 mm. for compositions on the line E–H to 0.1 micron for compositions on the line G–H. At 2000° C. these equilibrium partial pressures vary continuously from approximately 693 mm. for compositions on the line E–H to 2340 microns for compositions on the line G–H.

In the preceding description, we have referred to a uranium monocarbide-like compound or structure having the formula $U(C_xO_{1-x})$ where X may be a number running from less than 1 to 0.75. However, aside from the display of the phase diagram indicated in FIG. 1 which shows the $U(C, O)$-containing phases and the curve of FIG. 2 which indicates that the lattice parameter reaches a minimum at some discrete composition, no tangible proof in terms of chemical evidence, as to the existence of said compounds or phases has been given.

The following examples will prove the existence of the oxygen-saturated uranium carbide phase relationships by utilizing the reactants $UC + UO_2$ (Equation 2) in one case and the reaction between carbon and uranium dioxide in another (Equation 1).

*Example I*

The object of this example is to show that the limiting composition of a $U(C_xO_{1-x})$ composition is $U(C_{.75}O_{.25})$.

The following equations may be written to represent the reaction of carbon and uranium dioxide at a temperature in the range of 1525° C. to 2000° C. wherein the initial $UO_2/C$ mole ratio was 0.4 and wherein said reactants were maintained below the equilibrium partial pressure of carbon monoxide as previously explained.

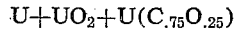

| | | Molar ratio $UO_2/C$ |
|---|---|---|
| (14) | $2.9C + UO_2 = U(C_{.95}O_{.05}) + 1.95CO$ | .345 |
| (15) | $2.7C + UO_2 = U(C_{.85}O_{.15}) + 1.85CO$ | .370 |
| (16) | $2.5C + UO_2 = U(C_{.75}O_{.25}) + 1.75CO$ | .400 |
| (17) | $2.25C + UO_2 = U(C_{.625}O_{.375}) + 1.625CO$ | .444 |

The atomic percentages of the reactants before firing were U=18.2%, C=45.4%, and O=36.4%. These atomic percentages may be plotted directly on the phase diagram, and they are represented by point X of FIG. 1.

In this example, the initial reaction mixture was heated to a temperature of 1800° C. for 10 minutes while maintaining a carbon monoxide partial pressure over said mixture of approximately 65 microns. After this period, the reaction products were allowed to cool to room temperature under a pressure below 65 microns. The product was crushed to powder and the powder was subjected to X-ray diffraction analysis using CuK α radiation generated by a Phillips Norelco unit linked with a goniometer using a scintillation counter for receiving the diffracted X-rays, with the counter being synchronized to a recording system which plotted out angles of diffraction of the incident X-rays as well as intensity of the diffracted rays. By comparison with X-ray diffraction patterns taken with known mixtures of $UO_2$ and UC, we determined (based on the fact that the relative intensities of the refracted X-rays are a measure of concentration of the components of the mixture) that the reaction product contained, by weight, 3% $UO_2$ and 97% of another compound. Examination of the X-ray diffraction pattern of the reaction product indicated that it was not UC, but had the UC crystal structure with a reduced lattice parameter—so that we have 97% of what we now call a $U(C, O)$ compound. We call this second phase $U(C, O)$ since it has the UC structure, as seen in the X-ray pattern, and has a lattice parameter smaller than that accepted for UC. At this point we have not yet presented complete enough evidence to show that this second phase may be represented as $U(C, O)$; but we know that it is a UC type structure which has a lattice parameter that has been reduced in magnitude for some reason, as yet unknown. We now resort to chemical analyses to determine the cause of the lattice parameter change.

Taking a chemical analysis for the entire reaction product, we found the total chemical analysis (including the $UO_2$ phase) in weight percent to be: combined C=3.56%, oxygen=1.79%, and nitrogen=.010%. In this example we are dealing with only two phases: $UO_2$ and "$U(C, O)$" as determined by X-ray and metallographic analysis. The chemical constitution of the $U(C, O)$ phase is delineated as follows: Now then, having determined the amount of $UO_2$ (3%) when it occurs in the total product (and consequently in the total chemical analyses), the remainder must be $U(C, O)$ (97%).

Consider the 3% and 97% as grams, then we have 3 grams of $UO_2$ and 97 grams of $U(C, O)$. $UO_2$ contains 88.15% U and 11.85% O, by weight. Hence 3 grams of $UO_2$ contain $3 \times .8815 = 2.64$ g. U and $3 \times .1185 = 0.36$ g. oxygen. Since we have based the above calculation with $UO_2$ on the gram wt. basis we may do the same with the total chemical analysis. Thus, in 100 grams of the total product, $UO_2$ and $U(C, O)$, we have 3.56 grams of carbon, 1.79 grams of oxygen and 0.010 gram of nitrogen. The oxygen in the $U(C, O)$ phase = total oxygen less oxygen in $UO_2 = 1.79 - 0.36 = 1.43$ g. oxygen in $U(C, O)$ phase. The carbon in the $U(C, O)$ phase = the total chemically combined carbon reported or 3.56 g. Since nitrogen is not soluble appreciably in $UO_2$ the total nitrogen reported is in the $U(C, O)$ phase; this is 0.010 g. Thus, in the 97 grams of the $U(C, O)$ we have 1.43 grams of oxygen, 3.56 grams of carbon, and 0.01 gram of nitrogen. The remainder of the $U(C, O)$ phase is taken to be uranium. Thus, 97.00 minus $(1.43+3.56+0.01)$ which equals 92.00 grams of uranium. We now have the analysis of the $U(C, O)$ phase based upon the percent phases as determined by X-ray relative intensities and upon the chemical analysis of the reacted product. The analysis of the $U(C, O)$ phase may be tabulated as below:

| Wts. of U, C, O, N in 97 grams of U(C, O) | Percentages by wt. in U(C, O) | Moles in 100 g. U(C, O) | Moles/mole of U in U(C, O) |
|---|---|---|---|
| U— 92.00 | 94.85 | 94.85/238 =.399 | 1.00 |
| C— 3.56 | 3.67 | 3.67/12 =.306 | .77 |
| O— 1.43 | 1.47 | 1.47/16 =.092 | .23 |
| N— 0.01 | 0.01 | .01/14 =.001 | .003 |

Having the moles/mole of uranium, we can now write the formula $U(C_{.77}O_{.23})$ which is within the limits of experimental error of producing the exactly desired

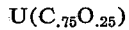

$$U(C_{.75}O_{.25})$$

composition.

Example II

The object of this example is the same as in Example I, except that in this case it will be illustrated with a different reaction mixture. For the reaction between uranium monocarbide and $UO_2$ at a temperature in the range of 1525° C. to 2000° C. we may write:

Molar ratio $UO_2/UC$

(18) $2.9UC + .1UO_2 = 3U(C_{.95}O_{.05}) + .05CO$ --- .0345
(19) $2.7UC + .3UO_2 = 3U(C_{.85}O_{.15}) + .15CO$ --- .111
(20) $2.5UC + .5UO_2 = 3U(C_{.75}O_{.25}) + .25CO$ --- .200
(21) $2.25UC + .75UO_2 = 3U(C_{.625}O_{.375})$
    $+ .375CO$ --- .333

If more than 25% of the carbon atoms are replaced by oxygen atoms, then the $U(C, O)$ products of Equation 21 should be represented by $U(C_{.625}O_{.375})$. However, if only 25% of the carbon atoms may be replaced by oxygen atoms, then the products obtained from Equation 21 should be represented by a combination of $U(C_{.75}O_{.25})$ and $UO_2$. In other words, we are reacting UC with sufficient $UO_2$ to provide an amount of oxygen in UC higher than that of $U(C_{.75}O_{.25})$ if such a higher oxygen-containing UC-like compound exists. The atomic percentages of the reactants to one decimal are:

$$U=44.5\%, C=22.2\%, O=22.2\%$$

These may be plotted in the phase diagram as the initial starting composition.

After reacting at 1800° C. under a partial pressure of CO below 65 microns (i.e., the equilibrium partial pressure of CO) for one hour, the products contained 9% $UO_2$ and 91% $U(C, O)$ by weight as determined by a comparison of relative intensities of the diffracted X-rays from known mixtures of UC and $UO_2$ and by examination of the X-ray diffraction pattern of the phases present. The percentage of $UO_2$ obtained from the relative intensities of the diffracted X-rays from the product showed that 9% of the $UO_2$ had not reacted. The $UO_2$ contained oxygen $= 9 \times .1185 = 1.07$. Oxygen for $U(C, O) =$ total less $1.07 = 2.60 - 1.07 = 1.53$ Carbon for $U(C, O) =$ total chemically combined carbon $= 3.21$. Nitrogen for $U(C, O) =$ total nitrogen $= .063$. Uranium $= 91.00 - (1.53 + 3.21 + .06) = 86.20$. Tabulating we have the following:

| Wt. in 91 grams of U(C, O) | Wt. percent in U(C, O) | Moles in 100 g. of U(C, O) | Moles/mole of U in U(C, O) |
|---|---|---|---|
| U— 86.20 | 94.72 | 94.72/238 =.398 | 1.00 |
| C— 3.21 | 3.53 | 3.53/12 =.294 | .74 |
| O— 1.53 | 1.68 | 1.68/16 =.105 | .26 |
| N— .06 | .07 | .07/14 =.005 | .01 |
| 91.00 | 100.00 | | |

Thus the formula for $U(C, O)$ is $U(C_{.74}O_{.26}N_{.01})$. Adjusting for .01 mole of nitrogen, we may write

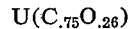

$$U(C_{.75}O_{.26})$$

This is within experimental error of $U(C_{.75}O_{.25})$. Balancing the equation for the production of $U(C_{.75}O_{.25})$ instead of $U(C_{.625}O_{.375})$ we would have the following:

$$2.25UC + .75UO_2 = 2.7U(C_{.75}O_{.25}) + .3UO_2 + .225CO$$

This equation agrees with the results actually obtained. We have thus shown by Examples I and II that the limiting composition of a $U(C_xO_{1-x})$ composition is

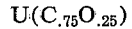

$$U(C_{.75}O_{.25})$$

As a further measure of proof that the limiting value of X is .75 in the $U(C_xO_{1-x})$ compound is demonstrated by the fact that whenever attempts were made to produce a $U(C_xO_{1-x})$ compound with more than 25% of the carbon atoms of UC replaced by oxygen atoms, $UO_2$ was invariably found in the resultant reaction products.

Example III

The following example illustrates the synthesis of a $U(C_{.75}O_{.25})$-containing phase by the reaction between $UH_3$, C and $UO_2$ (Equation 4). Specifically the reaction being discussed is:

(22) $5.0UH_3 + 5.0C + 1.0UO_2$
    $\rightarrow 6U(C_{.75}O_{.25}) + 0.5CO + 7.5H_2$ This is a preferred procedure for preparing $U(C_{.75}O_{.25})$ because the uranium hydride decomposes to form reactive uranium metal and hydrogen gas. This gas is removed by the vacuum pumping system. At about 900° C. the reactive uranium metal thus formed reacts with the carbon present to form a very reactive uranium carbide.

In this example —200 mesh powders of the raw materials were mixed by hand. Sufficient cyclohexane was added to make a slurry, and then one percent by weight naphthalene was added. This mixture was stirred continuously until it was dry. Pellets were pressed from these powders at 30,000 p.s.i., and the pellets placed on beryllia boats in the vacuum sintering furnace. The furnace was evacuated to 3 microns of mercury pressure, and then heated slowly so that the pressure within the furnace due to desorption of gases and to decomposition of $UH_3$ did not exceed 100 microns. A temperature of about 950° C. was reached in 13½ hours. If heating is too rapid, the hydrogen from decomposition of $UH_3$ will be evolved too rapidly and will cause the pellets to explode. Obviously, the heating rate could be much faster if the specimens were in powder form. At this temperature the reactive uranium metal formed by decomposition of $UH_3$ reacted with the carbon to form UC. During this reaction the pressure in the furnace rose to over 200 microns, but it fell within three minutes to four microns. The temperature of the specimens was raised rapidly to 1400° C. in 15 minutes where the pressure reached 105 microns. As heating was continued, the pressure fell continuously until it reached 35 microns at 1800° C. The time required to raise the temperature of the specimens from 1400° C. to 1800° C. was 36 minutes. The specimens were held at approximately 1800° C. for 6 minutes. The power to the furnace was then cut off, and the specimens cooled to 1500° C. in 5½ minutes. The specimens remained in the furnace under vacuum until they were at room temperature. During the cooling period the pressure in the furnace fell very rapidly. At room temperature the pressure was approximately 0.01 micron. X-ray diffraction analysis of the resulting product showed that the reaction had produced a phase corresponding to

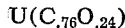

$$U(C_{.76}O_{.24})$$

It should be noted here that vacuum is not essential for the reactions discussed herein. Any inert atmosphere can be used as long as the carbon monoxide partial pressure is properly controlled. In this example, the pressure as measured was due almost entirely to carbon monoxide. However, even the total pressure of 35 microns was considerably lower than the 65 micron equilibrium carbon monoxide partial pressure for $U(C_{.75}O_{.25})$ at 1800° C.

*Example IV*

This example illustrates the improved chemical stability of the $U(C_xO_{1-x})$ composition.

A quantity of $U(C_{.75}O_{.25})$ product, synthesized in accordance with the foregoing procedure, was ground in a diamond mortar until it was −200 mesh in size. Uranium monocarbide obtained from a commercial producer was also ground to pass a −200 mesh sieve. X-ray diffraction analysis showed that this material was UC containing approximately 2 wt. percent of $UC_2$ and 2 wt. percent $UO_2$. A third sample consisted of −40 mesh UC which consisted of particles considerably larger than those in the other two samples. One gram of each of these samples was placed in separate 50 cc. beakers, each of which contained 20 cc. of distilled water. These mixtures were heated slowly on a hot plate, and the temperatures of the mixtures were measured by a mercury thermometer.

No evidence of reaction was found until the temperatures of the mixtures reached 60–62° C. Slight reaction, as shown by the formation of small bubbles, was observed in this temperature range in both the −200 mesh UC-water mixture and the −40 mesh UC-water mixture. At 80° C. the UC reacted violently with the water. By contrast, the first evidence of reaction between the oxygen saturated U(C, O) and water was observed at 87° C. At 97° C. the oxygen saturated U(C, O) and water continued to show only slight evidence of reaction, whereas the UC was reacting violently with the water. The −200 mesh samples were then cooled to room temperature and dried under vacuum. X-ray diffraction analysis showed that the oxygen saturated U(C, O) material was virtually unchanged, but the UC was converted to uranium dioxide and uranium hydrates. This clearly demonstrates the improved stability of the oxygen-containing $U(C_xO_{1-x})$ material.

It should be understood that wherever reference is made to the compound $U(C_xO_{1-x})$ where X is a number from less than 1 to .75, such compound is also intended to include relatively small amounts of nitrogen existing in amounts no greater than about 0.5 atomic percent or less. We have found that even under the most rigid control of furnace atmospheres, a slight, but perceptible, nitrogen contamination is difficult to avoid.

It will be clear to those skilled in the art that analogous equations may be written and a similar analysis applied to the other initial reaction mixtures mentioned previously to prove the limiting stoichiometry of the $U(C_xO_{1-x})$ compound. It will also be clear from the foregoing description, taken in combination with the accompanying phase diagram of FIG. 1, that we have provided a method for accurately and reproducibly synthesizing a valuable modification of uranium monocarbide.

Having thus described our invention, we claim:

1. An oxygen-saturated uranium carbide compound represented by the formula $U(C_{0.75}O_{0.25})$, said compound having a sodium chloride crystal structure with a lattice parameter from a value lower than the accepted value for uranium monocarbide to a limiting value of 0.75, said compound being further characterized in that it is more resistant to oxidation and hydrolysis, relative to uranium monocarbide.

2. A method of synthesizing a material having the formula $U(C_{.75}O_{.25})$ which comprises reacting a starting reaction mixture selected from the group consisting of (1) $C+UO_2$; (2) $UC+UO_2$; (3) $UC_2+UO_2$;

(4) $UH_3+C+UO_2$; (5) $U+C+UO_2$;

(6) $U+UC+UO_2$; (7) $U+UC_2+UO_2$; (8) $UC+U_3O_8$; (9) $UC_2+U_3O_8$; (10) $U+CO$ (gas); (11) $UC+CO$ (gas); (12) $C+U_3O_8$ and (13) $U+C+U_3O_8$, the ratio of components of said reaction mixture being selected from, by reference to the accompanying phase diagram, any point on the line D–G, heating the selected mixture at a temperature in the range of 1525° C. to 2000° C. in an atmosphere in which the partial pressure of carbon monoxide does not exceed the equilibrium pressure for $U(C_{.75}O_{.25})$ at said temperature until said compound has formed and then cooling the resultant product.

3. A method of synthesizing a composition containing a compound having the formula $U(C_{.75}O_{.25})$ which comprises reacting a starting reaction mixture selected from the group consisting of (1) $C+UO_2$; (2) $UC+UO_2$; (3) $UC_2+UO_2$; (4) $UH_3+C+UO_2$; (5) $U+C+UO_2$; (6) $U+UC+UO_2$; (7) $U+UC_2+UO_2$; (8) $UC+U_3O_8$; (9) $UC_2+U_3O_8$; (10) $U+CO$ (gas); (11) $UC+CO$ (gas); (12) $C+U_3O_8$ and (13) $U+C+U_3O_8$, the ratio of components of said reaction mixture being selected from, by reference to the accompanying phase diagram, any point within area D–G–H thereof, heating said selected mixture at a temperature in the range 1525° C.–2000° C. in an atmosphere in which the partial pressure of carbon monoxide does not exceed the equilibrium pressure for $U(C_{.75}O_{.25})$ at said temperature until said compound has formed and then cooling the resultant product.

4. The method according to claim 3 wherein the partial pressure of carbon monoxide is no greater than about 0.1 micron of mercury at 1525° C. to about 2340 microns at 2000° C.

References Cited by the Examiner

AEC Document, TID-7614, pages 95 and 96, April 4, 1961.

Meerson et al.: Soviet Journal of Atomic Energy, Consultants Bureau Translation, vol. 9, No. 5, pages 927–931, September 1961. TK 9001 A95.

CARL D. QUARFORTH, *Primary Examiner.*

UNITED STATES PATENT OFFICE
CERTIFICATE OF CORRECTION

Patent No. 3,208,818            September 28, 1965

Robert F. Stoops et al.

It is hereby certified that error appears in the above numbered patent requiring correction and that the said Letters Patent should read as corrected below.

Column 5, line 64, for "C=22.2%" read -- C=33.3% --.

Signed and sealed this 27th day of September 1966.

(SEAL)
Attest:

ERNEST W. SWIDER            EDWARD J. BRENNER
Attesting Officer            Commissioner of Patents

UNITED STATES PATENT OFFICE
CERTIFICATE OF CORRECTION

Patent No. 3,208,818                         September 28, 1965

Robert F. Stoops et al.

It is hereby certified that error appears in the above numbered patent requiring correction and that the said Letters Patent should read as corrected below.

Column 5, line 64, for "C=22.2%" read -- C=33.3% --.

Signed and sealed this 27th day of September 1966.

(SEAL)
Attest:

ERNEST W. SWIDER
Attesting Officer

EDWARD J. BRENNER
Commissioner of Patents